July 31, 1956     F. W. SAMPSON ET AL     2,756,566
ICE TRAY
Filed Feb. 1, 1954
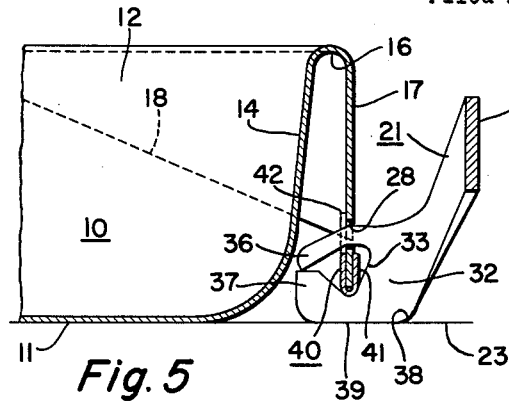
Fig. 5
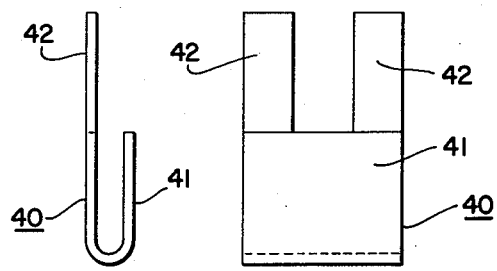
Fig. 7     Fig. 6
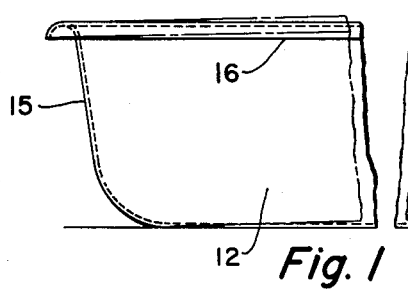
Fig. 1
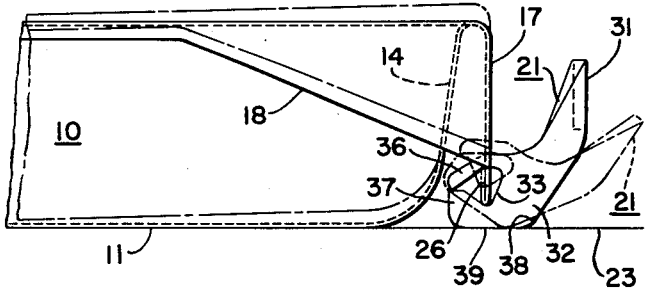
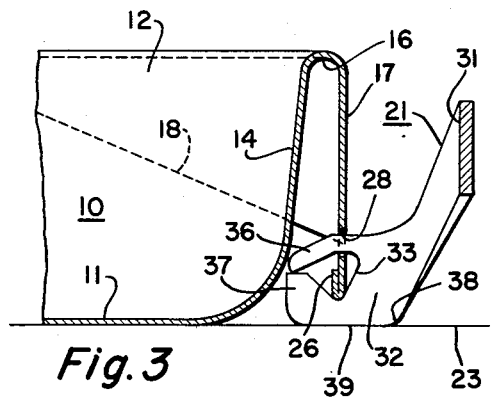
Fig. 3
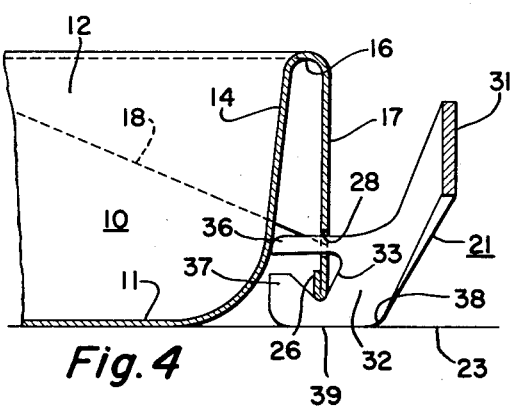
Fig. 4
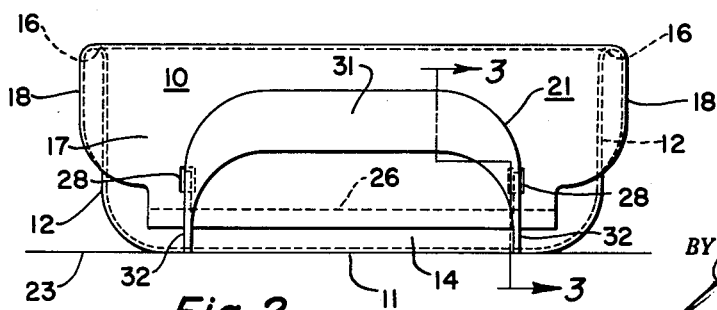
Fig. 2
INVENTORS
Frederick W. Sampson
Arthur J. Frei
BY
Their Attorney United States Patent Office 2,756,566
Patented July 31, 1956

2,756,566
ICE TRAY

Frederick W. Sampson and Arthur J. Frei, Dayton, Ohio, assignors to General Motors Corporation, Detroit, Mich., a corporation of Delaware Application February 1, 1954, Serial No. 407,344

3 Claims. (Cl. 62—108.5)

This invention relates to the mounting of a combined handle and cam on the pan portion of a freezing device associated with refrigerators.

Freezing devices ordinarily employed in household refrigerators for freezing water into ice blocks usually include a pan or tray having a grid disposed therein. Such freezing pans are placed upon a flat support in the freezing compartment of a refrigerator and the pan normally becomes ice bonded to the support while freezing of its contents takes place. Various arrangements of providing a manually actuated cam handle on such pans have been used to break the bond between the pan and its support so that the pan may be easily removed therefrom. Most of such arrangements have complicated and increased the manufacturing cost of the pan and have advanced the time required to pivotally assemble a cam handle upon a pan. In some pan structures of this type the mounting means or bracket for attaching a cam handle thereto has been brazed or welded directly to an end wall of the pan and this mars the inner surface of the pan and makes it difficult to provide a continuous unbroken coating of wax or the like thereon.

An object of this invention is to provide an improved freezing device for refrigerators wherein the pan portion thereof has a cam handle pivotally mounted thereon in a novel and less expensive manner.

Another object of this invention is to provide a simplified pivotal mounting of a cam handle on a pan of a freezing device whereby the time required to assemble the device is reduced to a minimum.

A further and more specific object of this invention is to pivotally mount a combined cam and handle to an integral extension on a drawn or stamped sheet metal pan portion of a freezing device for refrigerators against detachment therefrom wherein the handle applies a force to the integral extension of the freezing pan without damaging or deforming the same.

Further objects and advantages of the present invention will be apparent from the following description, reference being had to the accompanying drawings, wherein preferred forms of the invention are illustrated.

In the drawings:

Figure 1 is a broken side view of a freezing pan and cam handle attached thereto in accordance with this invention;

Figure 2 is an end elevation of the freezing pan shown in Figure 1;

Figure 3 is a sectional view of the cam handle end of the freezing pan taken on the line 3—3 of Figure 2;

Figure 4 is a sectional view similar to Figure 3 and shows the cam handle in place on the pan prior to locking the same thereto;

Figure 5 is a sectional view similar to Figure 3 showing a modified form of the invention;

Figure 6 is an enlarged front view of a clip employed in the structure disclosed in Figure 5; and Figure 7 is a side view of the clip shown in Figure 6.

Referring to the drawings, the freezing tray 10 is a one-piece stamped, pressed or drawn elongated metal pan of thin sheet aluminum alloy having a flat bottom wall 11, outwardly inclined or flared side walls 12 and inclined end walls 14 and 15. Such a pan is adapted to have a grid disposed therein and this pan or tray together with the grid form a freezing device adapted to contain water or other substances to be frozen. Also the aluminum pan of such a freezing device is usually anodized and waxed, in a manner well known to those skilled in the art, to facilitate removal of its frozen contents therefrom. In drawing, pressing or stamping the pan 10 sufficient material is provided about the edges of the metal sheet to permit the rounding or rolling over of a top rim 16 thereon, an integral extension 17 projecting and depending from the one end wall 14 thereof and integral reinforcing side aprons 18. The rim 16, extension 17 and aprons 18 increases the structural strength of pan 10 and serves to prevent warpage and distortion thereof. Integral extension 17 continues from the one end wall 14 of pan 10 and depends from the top thereof in spaced relation thereto to provide a mounting, beyond the tray or pan walls, for a lever means in the form of a cam handle member generally represented by the reference character 21. Handle member 21 is substantially U-shaped in configuration and is pivotally mounted upon pan 10 in a manner to be presently described. The line indicated by the numeral 23 represents a flat refrigerated shelf surface of an evaporator of a refrigerating system or a flat support of a freezing compartment of a refrigerator cabinet upon which the pan is set and to which the pan becomes frozen-bonded. It is to be noted that the lower edge of the integral extension 17 of pan 10, depending downwardly along and spaced relative to the one end wall 14 thereof, terminates at a point above the pan bottom wall 11. Due to the thinness of extension 17 that portion thereof adjacent its lower edge is, preferably although not necessarily, bent or folded back upon itself as at 26 to reinforce the extension and provide a rounded bearing surface for engagement by the cam or lever handle 21 for a purpose as will be hereinafter described. Depending extension 17, integral with pan 10, has a pair of horizontal spaced apart openings 28 provided therein (see Figures 2 and 3). These openings 28 are spaced above the lower edge of the integral extension 17 and their bottom wall is located above the top portion of the bent back edge portion 26 thereon.

The bight portion of U-shaped cam lever 21 forms a handle 31 therefor and the end of the legs 32 thereof each has a slot 33 cut therein. The slots 33 are so shaped as to provide a seat in the lower portion thereof for receiving the rounded bearing surface at the lower edge of extension 17. Cutting of slot 33 in the end of the legs 32 of handle 21 provides opposed or upper and lower jaws 36 and 37 respectively adjacent the slots. A portion of lever 21, intermediate handle part 31 thereof and the jaws 36 and 37 at the end of the legs 32, is provided with a curved cam 38. A flat lower straight part 39 extends from the cams 38 to the end of legs 32. These flat parts or edges 39 on the legs of handle 21 are level with or are horizontally aligned with the bottom wall 11 of pan 10 and rest on or engage support 23 to normally hold the cam handle in an upright operative position. In Figure 4 of the drawings the handle 21 is shown with its jaws 36 and 37 open and with the one of the opposed or upper jaws 36 extended into or projecting through the openings 28 in the integral depending extension 17 on pan 10 to position the lower jaws 37 under the rounded bearing surface provided by the bent back lower edge portion 26 of extension 17. In order to assemble handle 21 to the extension 17 on pan 10 a suitable special tool or a pair of pliers or the like may be placed over the jaws 36 and 37 and force applied thereto. Due to jaw 36 being of less width than that of jaw 37 this force will crimp or pinch jaw 36 down against or into abutment with jaw 37 (see Figure 3) to close the slot 33. Thus the cam handle 21 is now secured to the depending extension 17 against detachment or removal thereof from pan 10 and is mounted thereon for pivotal movement about that portion of the lower edge of depending extension 17 below the openings 28 therein.

In operating the lever means or handle member 21, after the contents of tray or pan 10 has been frozen, its handle part 31 is grasped and pulled forwardly relative to the pan 10. This pulling force applied to member 21 causes the same to swing downwardly about its pivotal mounting and the curved cam portion 38 thereof pivots upon support 23 to multiply this force and transmit the same between the support and the lower portion of the integral depending extension 17 on pan 10. The cam portion 38 of handle 21 thereby forms a force multiplying means and elevates the end 14 of pan 10 relative to support 23, as shown by the dot-dash lines in Figure 1 of the drawings, to thus break the frozen or ice bond between the support and the pan to permit pan 10 and its frozen contents to be easily removed from or slid off its support. The brunt of the force applied to cam handle 21 is taken by the reinforced rounded bearing surface on the lower edge of extension 17, afforded by bending the edge portion of this extension back upon itself as described. Force applied to handle 21 is thereby prevented from tearing or deforming the lower edge of extension 17 and consequently the life of the freezing device is prolonged. The bending back of the lower portion of extension 17, as at 26, in addition to reinforcing the lower portion of this extension also gets rid of a sharp edge at the front of pan 10 and permits handling thereof without fear of cutting one's fingers.

A modified arrangement for reinforcing that portion of pan 10 which takes the brunt of force applied thereto by cam handle 21 is shown in Figure 5 of the drawings. In this form of freezing device the lower edge of the integral depending extension 17 of pan 10 is not bent back upon itself but is reinforced by substantially U-shaped metal clips generally referred to by the reference numeral 40 and shown in Figures 6 and 7. These metal clips 40 may be formed of scrap pieces of aluminum left over from the blank sheet from which the pan is stamped or pressed and therefore does not add to the expense of providing a pan and handle assembly of the type disclosed. Each metal clip 40 is bent to provide the same with a U-shaped body portion 41 and spaced apart integral projections 42 extending from the one leg of the U-shaped body portion 41 thereof. Clips 40 are fitted over the lower edge of the integral depending extension 17 on pan 10 in straddling relation thereto and slid upwardly so as to snugly embrace walls of this edge and reinforce same. The space intermediate the spaced apart projections 42 on clips 40 are aligned with the openings 28 in pan extension 17 and the one opposed or upper jaw 36 at the end of each leg 32 of handle lever 21 is inserted into or projected through the openings 28 in extension 17. This jaw 36 at each end of cam handle 21 is then crimped or pinched against or into abutment with jaw 37 to close the slot 33 and pivotally mount handle 21 upon the extension 17 of pan 10 as shown in Figure 5 and as previously described in connection with the mounting of handle 21 on the pan disclosed in Figures 3 and 4 of the drawings. The bight portion between the legs of the substantially U-shaped metal clips 40 engage the lower edge of the integral pan extension 17 and provide a substantially rounded bearing surface for the seat portion of slots 33 in handle 21.

Jaws 36 on handle 21 are located in the space between projections 42 on clips 40 and these jaws prevent clips 40 from sliding out of position. Clips 40 thus take the brunt of force applied by handle 21 to the integral depending pan extension 17 and therefore these clips reinforce its lower edge to prevent tearing or damage thereof. In this modified showing of the invention the crimping of jaws 36 to jaws 37 of cam handle 21 in addition to mounting the handle upon pan 10 against removal therefrom also locks the clips 40 in place thereon to eliminate the necessity of brazing or otherwise separately securing the clips to the integral pan extension 17.

It should be apparent from the foregoing that there is provided a freezing device for refrigerators having a cam or lever handle pivotally mounted thereon in an improved, low cost and simplified manner. By mounting the tray releasing lever upon an integral depending extension of the freezing tray or pan the inner surface of walls of the pan are not marred or obstructed and will not therefore interfere with the application of a continuous unbroken film or coat of wax or the like thereto. The novel method of pivotally mounting a handle upon the pan as herein disclosed eliminates the locating of a heavy reinforcing piece or bar on the pan and also screws or the like employed to rigidly secure such piece or bar to the pan. The tray or pan herein disclosed is comprised of a minimum number of parts and the cam handle can be quickly adjusted or assembled to the pan.

While the form of embodiment of the invention as herein disclosed constitutes a preferred form, it is to be understood that other forms might be adopted as may come within the scope of the claims which follow.

What is claimed is as follows:

1. An ice tray for containing a liquid to be frozen and adapted to be disposed on a support in a freezing compartment of a refrigerator comprising, a stamped sheet metal substantially flat bottom pan having upstanding impervious walls and an extension on the outside thereof formed integral with one of its end walls depending from the top thereof in spaced relation thereto, the lower edge of said integral depending extension terminating at a point spaced above the bottom of said pan, said integral extension being provided with horizontally spaced apart openings therein above its lower edge, that part of said integral extension intermediate the openings therein and its said lower edge being elongated vertically a greater distance than the vertical elongation of said openings to provide relatively tall bearing portions therebelow for a lever adapted to be pivotally mounted upon said tray, a substantially U-shaped lever on said integral depending extension, the bight portion of said U-shaped lever intermediate the legs thereof forming a handle therefor, each end of the legs of said U-shaped lever having a slot therein providing opposed jaws adjacent said slot, one of said opposed jaws on the legs of said U-shaped lever projecting through the openings in said depending extension on said pan with the other of said opposed jaws being located below the lower edge of said extension, at least the end of one of the opposed jaws on each leg of said lever being pinched to the end of the other opposed jaws to close said slots and pivotally lock said lever upon said depending extension against removal therefrom, said lever having a portion of its legs normally engaging said support for holding the lever in an upstanding operative position, said leg portions of said lever forming a force multiplying means between said lower edge of said integral depending extension on the pan of said support, and said lever when moved about its pivotal mounting by said handle applying force to said relatively tall bearing portions on said integral depending extension to elevate said pan relative to said support.

2. An ice tray for containing a liquid to be frozen and adapted to be disposed on a support in a freezing compartment of a refrigerator comprising, a stamped sheet metal substantially flat bottom pan having upstanding impervious walls and an extension on the outside thereof formed integral with one of its end walls depending from the top thereof in spaced relation thereto, a portion of the lower edge of said integral depending extension on said pan being bent back upon itself to provide a reinforced rounded bearing surface along the bottom thereof spaced above the bottom of said pan, said extension being provided with horizontally spaced apart openings therein above its lower edge and upwardly of the bent back portion thereof, a substantially U-shaped lever on said integral depending extension, the bight portion of said U-shaped lever intermediate the legs thereof forming a handle therefor, each end of the legs of said U-shaped lever having a slot therein providing upper and lower jaws adjacent said slots, said upper jaw of the slots in the legs of said U-shaped lever projecting through the openings in said depending extension on said pan with said lower jaw located below the bearing surface at the bottom thereof, at least the end of one of said jaws on each leg of said lever being pinched to the end of the other of said jaws to close said slots and pivotally mount said lever upon said depending extension against removal therefrom, said lever having a portion of its legs normally engaging said support for holding the lever in an upright operative position, said leg portions of said lever forming a force multiplying means between the pan and said support, and said lever when moved about its pivotal mounting by said handle applying force to said reinforced rounded edge of said integral extension beneath said openings to elevate said pan relative to said support.

3. An ice tray for containing a liquid to be frozen and adapted to be disposed on a support in a freezing compartment of a refrigerator comprising, a stamped sheet metal substantially flat bottom pan having upstanding impervious walls and an extension on the outside thereof formed integral with one of its end walls depending from the top thereof in spaced relation thereto, the lower edge of said integral depending extension being provided with horizontally spaced apart openings therein above its lower edge, a substantially U-shaped clip fitted over and straddling the lower edge of said extension below each of the openings therein for reinforcing the same, a substantially U-shaped lever on said integral depending extension, the bight portion of said U-shaped lever intermediate the legs thereof forming a handle therefor, each end of the legs of said U-shaped lever having a slot therein providing upper and lower jaws adjacent said slots, said upper jaw of the slots in the legs of said U-shaped lever projecting through the openings in said depending extension on said pan with said lower jaw located below said clips thereon, at least the end of one of said jaws on each leg of said lever being pinched to the end of the other of said jaws to close said slots and pivotally mount said lever upon said depending extension against removal therefrom, said lever having a portion of its legs normally engaging said support for holding the lever in an upright operative position, said leg portions of said lever forming a force multiplying means between said pan and said support, and said lever when moved about its pivotal mounting by said handle applying force to said clips on the lower edge of said integral extension beneath said openings to elevate said pan relative to said support.

References Cited in the file of this patent

UNITED STATES PATENTS

| | | |
|---|---|---|
| 1,420,815 | Christian | June 27, 1922 |
| 2,216,592 | Jacobs | Oct. 1, 1940 |
| 2,613,512 | Gaugler | Oct. 14, 1952 |